(12) United States Patent
Oikaze et al.

(10) Patent No.: US 8,294,903 B2
(45) Date of Patent: Oct. 23, 2012

(54) SURFACE SHAPE MEASUREMENT APPARATUS AND METHOD

(75) Inventors: Hirotoshi Oikaze, Osaka (JP); Takashi Urashima, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 12/864,760

(22) PCT Filed: Sep. 29, 2009

(86) PCT No.: PCT/JP2009/004970
§ 371 (c)(1),
(2), (4) Date: Jul. 27, 2010

(87) PCT Pub. No.: WO2010/038418
PCT Pub. Date: Apr. 8, 2010

(65) Prior Publication Data
US 2010/0309482 A1    Dec. 9, 2010

(30) Foreign Application Priority Data
Sep. 30, 2008   (JP) .................................. 2008-252313

(51) Int. Cl.
*G01B 11/02*   (2006.01)
(52) U.S. Cl. ...................................... 356/511
(58) Field of Classification Search .................. 356/485, 356/511
See application file for complete search history.

(56) References Cited

U.S. PATENT DOCUMENTS

| | | | | |
|---|---|---|---|---|
| 4,820,047 A | * | 4/1989 | Snyder | 356/484 |
| 4,832,489 A | * | 5/1989 | Wyant et al. | 356/513 |
| 5,694,217 A | * | 12/1997 | Hizuka | 356/491 |
| 6,690,473 B1 | * | 2/2004 | Stanke et al. | 356/601 |
| 2007/0024860 A1 | | 2/2007 | Tobiason et al. | |

FOREIGN PATENT DOCUMENTS

| | | |
|---|---|---|
| JP | 2003-344025 | 12/2003 |
| JP | 2005-326249 | 11/2005 |
| JP | 2007-40994 | 2/2007 |
| JP | 2008-166494 | 7/2008 |

OTHER PUBLICATIONS

International Search Report issued Dec. 15, 2009 in International (PCT) Application No. PCT/JP2009/004970.
International Preliminary Report on Patentability issued May 19, 2011 in International (PCT) Application No. PCT/JP2009/004970.

* cited by examiner

*Primary Examiner* — Tarifur Chowdhury
*Assistant Examiner* — Jonathon Cook
(74) *Attorney, Agent, or Firm* — Wenderoth, Lind & Ponack, L.L.P.

(57) ABSTRACT

The measurement accuracy of an apparatus for measuring the surface shape of an object utilizing a two-wavelength phase-shift interferometry is improved. A low-coherence light source, a plurality of wavelength filters with different transmission wavelengths, an angle control unit and an analysis unit are provided. When performing a two-wavelength phase shift method, the analysis unit detects the wavelength difference between two wavelengths, and corrects a calculated wavelength value and a calculated phase value of one of the wavelengths for preventing a fringe-order calculation error. Next, the angle of the wavelength filters is controlled for making the actual wavelength difference coincident with a designed value. Thus, the wavelength difference between the two wavelengths is continuously controlled to be constant, which enables measurements of surface shapes with high accuracy, even when there are wavelength fluctuations due to the temperature change or the time elapse.

9 Claims, 12 Drawing Sheets

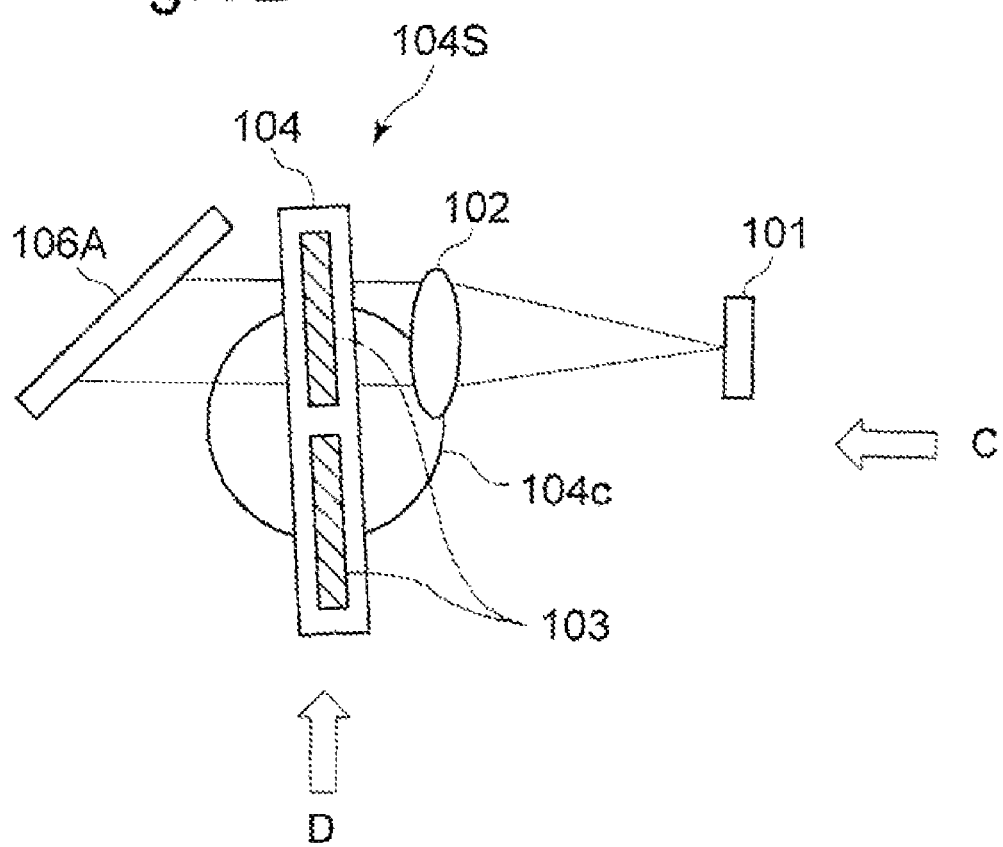

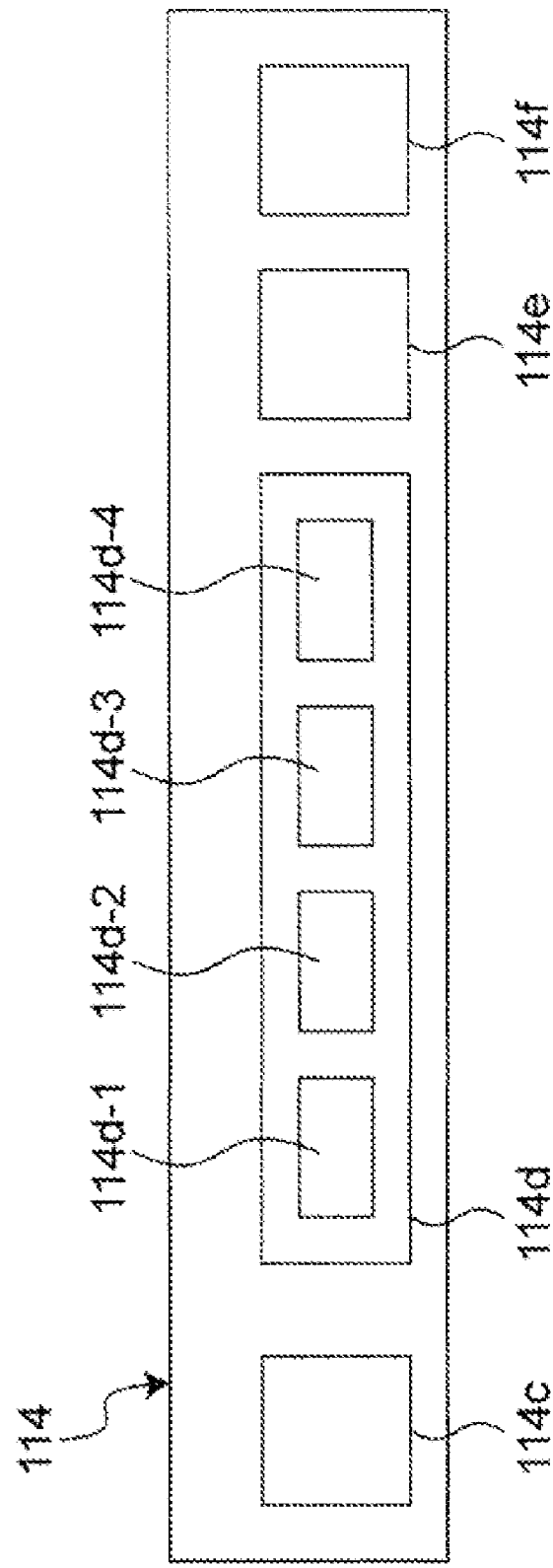

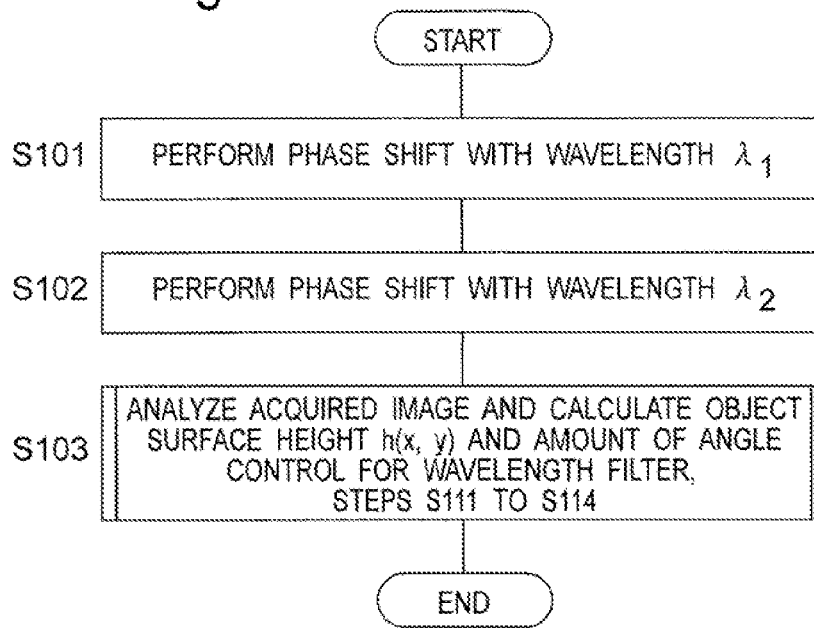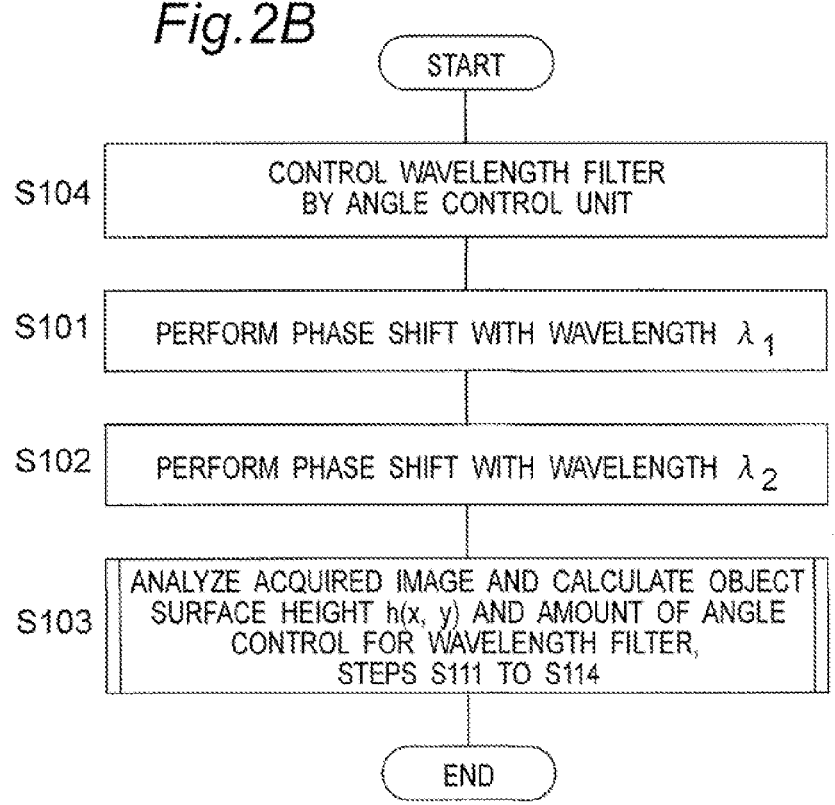

PEAK INTERVAL = $\Delta \lambda \div \Delta \lambda'$
IDEAL FRINGE ORDER $m_1$

ACTUAL WAVELENGTH DIFFERENCE
$\Delta \lambda = \lambda_2 - \lambda_1$

CALCULATED WAVELENGTH DIFFERENCE
$\Delta \lambda' = \lambda_2' - \lambda_1'$

PEAK INTERVAL = 1
IDEAL FRINGE ORDER $m_1$

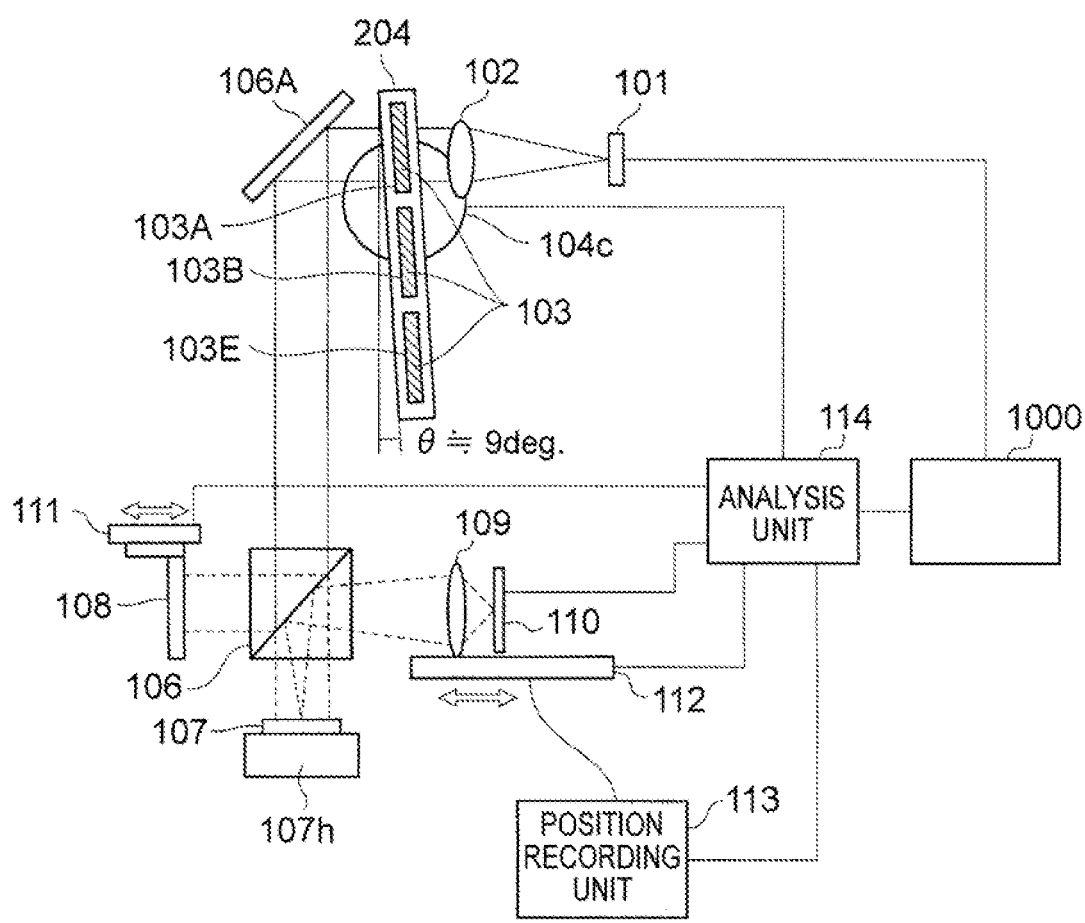

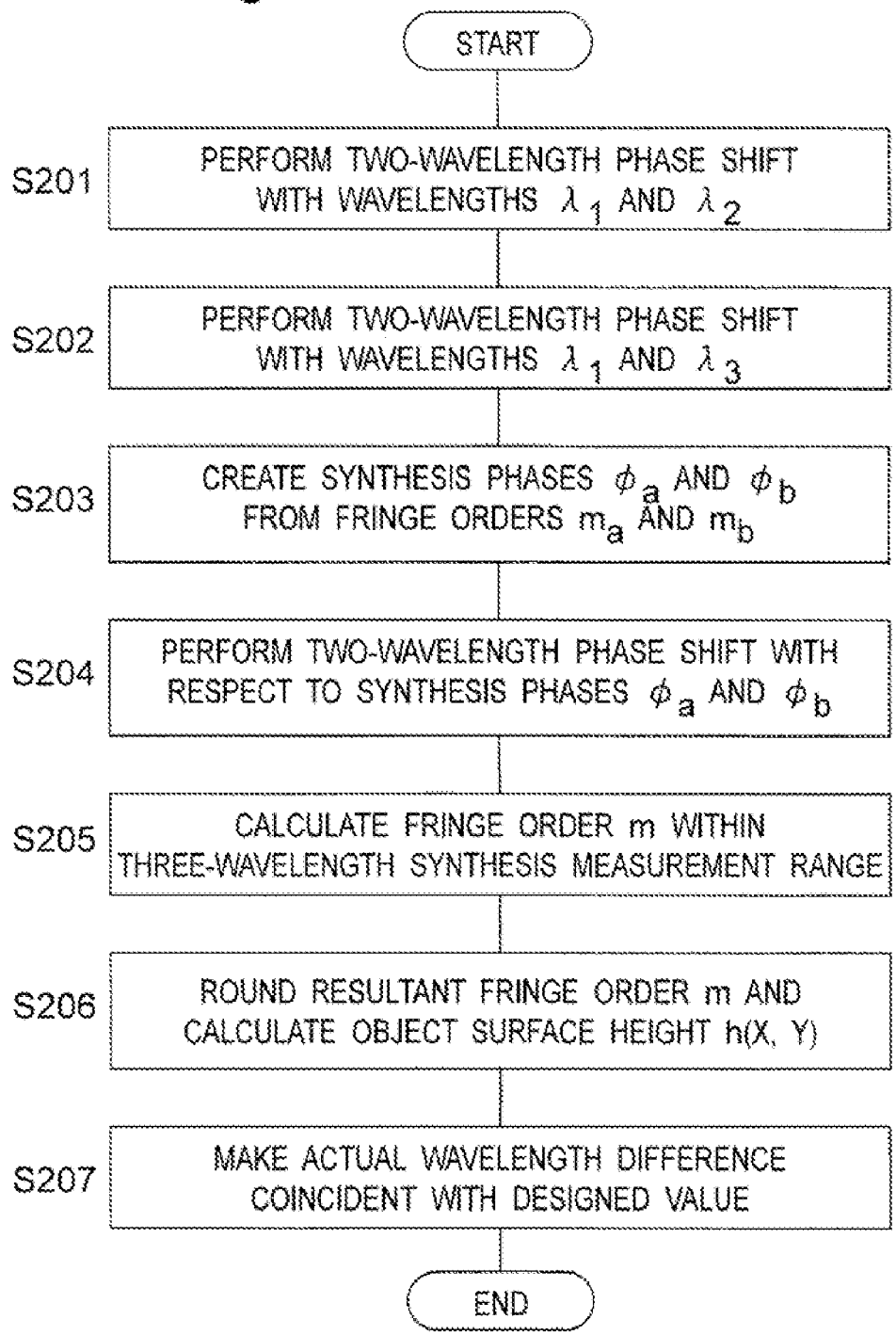

SURFACE SHAPE MEASUREMENT APPARATUS AND METHOD

TECHNICAL FIELD

The present invention relates to an apparatus and method for measuring the surface shape of an object, particularly according to a multi-wavelength phase-shift interferometry which performs irradiation of light with a plurality of different wavelengths by changing over thereamong, regarding techniques for directing light to an object for measuring a surface shape of the object based on the interfering light.

RELATED ART

Conventionally, there has been known a phase-shift interferometry which utilizes interference of optical waves, as a method for accurately measuring the surface shape of an object (refer to Patent Document 1, for example). This phase-shift interferometry has a characteristic of analyzing the phase of interference fringes from a plurality of images of interference fringes resulted from moving a reference surface by a certain known amount, thereby canceling the influence of background or noise. Accordingly, the phase-shift interferometry has excellent phase detection accuracy of about 1/100 of the wavelength.

However, actually, the phase at a certain pixel (x, y) can be obtained from (Equation 1) using an integer m (hereinafter, referred to as a fringe order). On the other hand, the interference-fringe phase which can be detected through this method is $\phi_1(x, y)$ in (Equation 1), wherein the phase ranges from 0 to $2\pi$. At this state, it is impossible to express the shape of an object surface and, therefore, there is a method called "Phase Connection" which detects portions where the phase exceeds $2\pi$ and folds back and, further, connects them to one another. However, even with this method, if there is a discontinuous portion or a level difference equal to or more than half the wavelength, this induces a discontinuity in interference fringes, which makes it impossible to perform accurate shape measurements.

$$\phi_1'(x, y) = \phi_1(x, y) + 2\pi m(x, y) \quad \text{(Equation 1)}$$

For addressing this issue, there has been known a "two-wavelength phase-shift interferometry" which performs irradiation of light with two different wavelengths while changing over therebetween (refer to Patent Document 2, for example). This method is a method which makes comparison between the phases of two light with different wavelengths and can uniquely determine the fringe order of the wavelength of one light out of them, within the range within which the phase difference therebetween is 0 to $2\pi$. In this case, assuming that the wavelength and the phase of the light to be determined in fringe order are $\lambda_1$ and $\phi_1(x, y)$ and, also, the fringe order $m(x, y)$ can be determined, the height $h(x, y)$ of the surface of the object can be obtained from (Equation 2) and, therefore, basically, the measurement can be performed with the accuracy of the phase shift of a single wavelength.

$$h(x, y) = (\lambda_1/2)\{(\phi_1(x, y)/2\pi) + m(x, y)\} \quad \text{(Equation 2)}$$

Further, considering that the phases of two wavelengths (wavelengths $\lambda_1$ and $\lambda_2$) are synthesized to create light with a wavelength corresponding to the interval during which the phase differences therebetween ranges from 0 to $2\pi$, this method is equivalent to a phase detection using light with the synthesis wavelength. In this case, the synthesis wavelength $\lambda_{eq}$ can be expressed as (Equation 3). In the case of the synthesis wavelength created from the two wavelengths, the measurement range is increased to $\lambda_{eq}/2$, while in the case of a single wavelength the measurement range is $\lambda_1/2$.

$$\lambda_{eq} = (\lambda_1 * \lambda_2)/(\lambda_2 - \lambda_1) \quad \text{(Equation 3)}$$

This method will be described, in detail, hereinafter. At first, phase shifts are respectively performed with the wavelengths $\lambda_1$ and $\lambda_2$. Assuming that the phases detected at each pixel are $\phi_1$ and $100_2$, (Equation 4) holds. In this case, h(x, y) indicates the height at a pixel (x, y), and $m_1(x, y)$ and $m_2(x, y)$ indicate the ideal fringe numbers of both the wavelengths. Next, the optical path difference $\Delta D$ between the two wavelengths is found according to (Equation 5) using these phase values.

$$\phi_1(x, y) = (4\pi/\lambda_1) \times h(x, y) - 2\pi m_1(x, y)$$

$$\phi_2(x, y) = (4\pi/\lambda_2) \times h(x, y) - 2\pi m_2(x, y) \quad \text{(Equation 4)}$$

$$\Delta D = (\lambda_1 \times \phi_1 - \lambda_2 \times \phi_2)/2\pi \quad \text{(Equation 5)}$$

Thus, the fringe order of the wavelength $\lambda_1$ at the pixel (x, y) can be determined as follows.

At first, case classification is performed, using the relationship between the fringe orders $m_1$ and $m_2$. Namely, there are the following three cases regarding the relationship between the fringe orders $m_1$ and $m_2$, within the measurement range provided by the synthesis wavelength created from the two wavelengths. The fringe order m is found according to respective different calculation equations.

(1) In the case of $m_2 = m_1$, (Equation 6)
(2) In the case of $m_2 = m_1 - 1$, (Equation 7)
(3) In the case of $m_2 = m_1 + 1$, (Equation 8)

$$m = \Delta D / \Delta \lambda$$
$$= (\lambda_1 \times \phi_1 - \lambda_2 \times \phi_2)/2\pi(\lambda_2 - \lambda_1) \quad \text{(Equation 6)}$$

$$m = (\Delta D/\Delta\lambda) + (\lambda_2/\Delta\lambda)$$
$$= (\lambda_1 \times \phi_1 - \lambda_2 \times \phi_2)/2\pi(\lambda_2 - \lambda_1) + \lambda_2/(\lambda_2 - \lambda_1) \quad \text{(Equation 7)}$$

$$m = (\Delta D/\Delta\lambda) - (\lambda_2/\Delta\lambda)$$
$$= (\lambda_1 \times \phi_1 - \lambda_2 \times \phi_2)/2\pi(\lambda_2 - \lambda_1) - \lambda_2/(\lambda_2 - \lambda_1) \quad \text{(Equation 8)}$$

The classification among these cases can be determined based on the conditions of "(1) $-\pi < (\phi_1 - \phi_2) < \pi$", "(2) $(\phi_1 - \phi_2) > \pi$", and "(3) $(\phi_1 - \phi_2) < -\pi$". The fringe order can be determined by rounding the fringe order m found as above.

Through the aforementioned operations, it is possible to widen the measurement range.

As an application of this method, there is a multi-wavelength phase-shift interferometry which performs irradiation of light with different wavelengths for creating two different synthesis wavelengths and, further, applies the two-wavelength phase-shift interferometry to the synthesis wavelengths for further enlarging the synthesis wavelengths.

The multi-wavelength phase-shift interferometry including the two-wavelength phase-shift interferometry has the issue of weakness against noise. The reason therefor will be described hereinafter.

First, the number n of fringe orders which can be uniquely determined within the measurement range provided by a single synthesis wavelength can be obtained from (Equation 9). The number of fringe orders which can be determined is increased with decreasing difference between the wavelengths. If the area within which the phase difference ranges from 0 to $2\pi$ is divided for devoting the resultant to the determination of the fringe orders, the phase-difference width assigned to a fringe order of 1 is $2\pi/n$. Assuming that the phase detection errors for the respective wavelengths are $\delta_{\phi 1}$ and $\delta_{100\ 2}$, the condition in which the occurrence of fringe order errors is prevented is (Equation 10), and the permissible phase detection error is decreased with increasing number n. For example, assuming that n equals to 30, it is necessary to make the errors for the respective wavelengths equal to or less than $\lambda/120$, in order to make the fringe order error zero.

$$n = \lambda_2/(\lambda_2 - \lambda_1) \quad \text{(Equation 9)}$$

$$\delta_{\phi 1} + \delta_{100\ 2} < (\pi/n) \quad \text{(Equation 10)}$$

Accordingly, even through the phase detection accuracy is-equivalent to that of a single wavelength, the tendency to induce errors in the fringe order determination is increased with increasing measurement range. Further, if (Equation 10) is not satisfied, this will induce errors in fringe orders, thereby inducing errors in units of one-half the wavelength, in the result of measurement. As external factors which induce errors in addition to random errors, there are two factors, which are the phase deviation between the two wavelengths, and the difference between the wavelength values used in the calculations and the wavelengths of light actually used for irradiation during the processing for analyzing the result of measurement.

For addressing the phase deviation between the two wavelengths, out of the factors which induce errors, there has been contrived a fringe-order error correction algorism which aims at improving the measurement accuracy of the two-wavelength phase-shift interferometry (refer to Patent Document 3, for example). This is a method which, during the rounding processing for calculating a fringe order, makes comparison between the unrounded fringe order and the rounded fringe order for detecting the influence of the phase deviation between the two wavelengths and, further, adds or subtracts a correction value to or from the fringe order before the rounding for canceling the influence, in order to correct the fringe order.

To describe this analytically, the actual phases obtained from phase shifts with the respective wavelengths include a phase deviation $\delta$ in the aforementioned (Equation 4) and can be expressed as (Equation 11).

$$\phi_1(x, y) = (4\pi/\lambda_1) \times h(x, y) - 2\pi m_1(x, y)$$

$$\phi_2(x, y) = (4\pi/\lambda_2) \times h(x, y) - 2\pi m_2(x, y) - \delta \quad \text{(Equation 11)}$$

The phase deviation $\delta$ in (Equation 11) is the phase difference between the two wavelengths at $h(x, y)=0$. By substituting the phase deviation $\delta$ into (Equation 6), (Equation 7), and (Equation 8), there are three cases as follows.
(1) In the case of $m_2 = m_1$, (Equation 12)
(2) In the case of $m_2 = m_1 - 1$, (Equation 13)
(3) In the case of $m_2 = m_1 + 1$, (Equation 14)

$$m = \Delta D / \Delta \lambda \quad \text{(Equation 12)}$$
$$= (\lambda_1 \times \phi_1 - \lambda_2 \times \phi_2)/2\pi(\lambda_2 - \lambda_1) +$$
$$\{\lambda_2 / 2\pi(\lambda_2 - \lambda_1)\}\delta$$

$$m = (\Delta D / \Delta \lambda) + (\lambda_2 / \Delta \lambda) \quad \text{(Equation 13)}$$
$$= \frac{(\lambda_1 \times \phi_1 - \lambda_2 \times \phi_2)}{2\pi(\lambda_2 - \lambda_1) + \lambda_2} +$$
$$(\lambda_2 - \lambda_1)$$
$$\{\lambda_2 / 2\pi(\lambda_2 - \lambda_1)\}\delta$$

$$m = (\Delta D / \Delta \lambda) - (\lambda_2 / \Delta \lambda) \quad \text{(Equation 14)}$$
$$= \frac{(\lambda_1 \times \phi_1 - \lambda_2 \times \phi_2)}{2\pi(\lambda_2 - \lambda_1) - \lambda_2} +$$
$$(\lambda_2 - \lambda_1)$$
$$\{\lambda_2 / 2\pi(\lambda_2 - \lambda_1)\}\delta$$

Namely, in any of the cases of (Equation 12) to (Equation 14), (Equation 15) holds. In the case of $\delta=0$, it is coincident with (Equation 6), otherwise, there is a deviation from $m_1$. In the ideal case of $\delta=0$, m equals to $m_1$ and, therefore, $m_1$ is called an ideal fringe order. The difference between the ideal fringe order $m_1$ and the calculated fringe order is referred to as $\Delta m$. If a random error is superimposed on the difference $\Delta m$, this will tend to cause the error portion to exceed 0.5 in the rounding processing, thereby increasing the rate of the occurrence of fringe order errors.

$$m = m_1 + \{\lambda_2/2\pi(\lambda_2 - \lambda_1)\}\delta \quad \text{(Equation 15)}$$

On the contrary, according to the aforementioned fringe order error correction algorism, at first, the value of the fringe order m which has been rounded is set as m', and the distribution of the difference (m'–m) is found. This distribution ranges from $-\frac{1}{2}$ to $\frac{1}{2}$ and can be converted into histograms as in FIG. 9A and FIG. 9B. If there is an influence of the phase deviation $\delta$, this will shift the peak of the distribution from 0, and the amount of the shift equals to the term of the phase deviation $\delta$, which enables detection of the term of the phase deviation $\delta$ without being influenced by random errors. A method in Patent Document 3 detects the amount of shift, then subtracts the resultant from the fringe order m and, thereafter, performs rounding thereon again, in order to prevent the occurrence of fringe order errors.

Further, according to Patent Document 3, generally, it is impossible to perform the aforementioned fringe-order error correction for surface shapes exceeding the measurement range provided by the synthesis wavelength created from two wavelengths. Therefore, there has been proposed a labeling method for extracting only portions which fall within a single measurement range.

RELATED ART DOCUMENTS

Patent Documents

PATENT DOCUMENT 1: JP-A No. 2003-344025
PATENT DOCUMENT 2: U.S. Pat. No. 4832489
PATENT DOCUMENT 3: JP-A No. 2005-326249

SUMMARY OF THE INVENTION

Issues to be Solved by the Invention

However, with the aforementioned conventional multi-wavelength phase-shift interferometry, it is possible to widen the measurement range, but the measurement accuracy is degraded. More specifically, with the aforementioned conventional algorism, the wavelengths of light for irradiation are treated as known values, but the actual wavelengths of the light may be different from the calculated values, due to the temperature change or the time elapse. In such cases, there is induced the issue of degradation of the noise detection accuracy and the fringe-order error correction accuracy.

In the following respective equations, "'" is added to calculated values, in order to distinguish them from actual values. The phases $\phi_1$ and $\phi_2$ can be obtained from the aforementioned (Equation 11) and, in the case of (Equation 5) and (Equation 6), (Equation 16) and (Equation 17) hold. In this case, $\lambda_1'$ and $\lambda_2'$ are calculated values.

$$\Delta D' = \{\lambda_1' \times \phi_1 - \lambda_2' \times \phi_2\}/2\pi \qquad \text{(Equation 16)}$$

$$m' = \Delta D/(\lambda_2' - \lambda_1') \qquad \text{(Equation 17)}$$

By substituting (Equation 11) into (Equation 16) and (Equation 17), it is possible to obtain the relationship between the fringe order m and the ideal fringe order $m_1$ as (Equation 18) and (Equation 19). These reveal that the error $\Delta m$ increases with increasing ideal fringe order $m_1$.

$$m(x, y) = \{(\lambda_2 - \lambda_1)/(\lambda_2' - \lambda_1')\} \times m_1(x, y) - \{\lambda_2'/2\pi(\lambda_2' - \lambda_1')\}\delta \qquad \text{(Equation 18)}$$

$$\Delta m(x, y) = m - m_1 = [\{\lambda_2 - \lambda_1 - (\lambda_2' - \lambda_1')\}/(\lambda_2' - \lambda_1')] \times m_1(x, y) - \{\lambda_2'/2\pi(\lambda_2' - \lambda_1')\}\delta \qquad \text{(Equation 19)}$$

As described above, the conventional algorism has focused attention on the amount of error caused by the rounding of fringe orders. However, the error $\Delta m$ varies depending on the fringe order, which makes the correction accuracy insufficient. If the error $\Delta m$ increases, this will induce an error.

The present invention overcomes the issues of the conventional technique and aims at providing a surface-shape measurement apparatus and method for measuring the surface shape of an object with higher accuracy than that of the conventional multi-wavelength phase-shift interferometry.

Means to Solve the Issues

In order to attain the aforementioned object, there is provided the following structure, according to the present invention.

According to a first aspect of the present invention, there is provided a surface shape measurement apparatus comprising:
a light source for emitting light;
a plurality of wavelength filters having respective different transmission wavelengths;
a changeover device for changing over among the plurality of wavelength filters;
an interference optical system configured to divide light passed through one wavelength filter out of the plurality of wavelength filters among which changeover is performed by the changeover device, further irradiate with divided lights an object to be inspected and a reference surface, and superimpose lights respectively reflected by the object and the surface on each other for causing interference therebetween;
an image pickup device configured to pick up an image of interference fringes resulted from the interference caused by the interference optical system;
an interference-fringe phase detection unit for calculating a phase of interference fringes from the image created through the image pickup by the image pickup device;
a filter angle adjustment unit which is configured to combine phases of interference fringes of at least two wavelengths, which have been calculated through changeover among the plurality of wavelength filters by the changeover device, to detect a wavelength difference therebetween, and, further, is configured to adjust an inclination angle of one wavelength filter out of the plurality of wavelength filters with respect to optical axis of the light incident to the wavelength filters, based on the wavelength difference; and
an analysis unit configured to measure a surface shape of the object to be inspected, using the interference optical system, the image pickup device, and the interference fringe phase detection unit, at a state where the inclination angle of the one wavelength filter is adjusted.

According to a second aspect of the present invention, there is provided the surface shape measurement apparatus according to the first aspect, further comprising
a calculation error prevention unit for correcting the phases of the interference fringes, based on the wavelength difference detected by combining the phases of the interference fringes of at least two wavelengths.

According to a third aspect of the present invention, there is provided the surface shape measurement apparatus according to the second aspect,
wherein the calculation error prevention unit comprises
a fringe-order calculation unit for calculating the fringe orders at respective pixels by combining the two wavelengths and the phases,
a fringe-order distribution analysis unit for detecting wavelength difference and phase difference between the two wavelengths from distribution of the fringe orders calculated by the fringe-order calculation unit,
a wavelength-value correction unit for correcting a calculated value of one of the wavelengths for making a calculated wavelength difference coincident with the wavelength difference, and
a phase-value correction unit for calculating a phase value of one of the wavelengths with which the phase of the one wavelength is corrected to make the phase difference between the two wavelengths zero, and correcting the phase.

According to a fourth aspect of the present invention, there is provided the surface shape measurement apparatus according to the third aspect, wherein
the filter angle adjustment unit comprises an angle control unit for adjusting the angle of the wavelength filters within a range of −1 to +1 degree with respect to a reference state where the wavelength filters are preliminarily inclined with respect to the optical axis by an angle set within a range of 5 to 10 degrees and, further, comprises an amount-of-angle-control calculation unit for calculating an amount of angle control, based on a difference between the designed value and the wavelength difference calculated by the fringe-order distribution analysis unit, and
in the calculation error prevention unit, the two wavelengths ($\lambda_1$, $\lambda_2$) combined through the plurality wavelength filters satisfy (Equation 20) at the reference state of the angle control unit, assuming that n is an integer.

$$n = \lambda_2/(\lambda_2 - \lambda_1) \qquad \text{(Equation 20)}$$

According to a fifth aspect of the present invention, there is provided a surface shape measurement method comprising;
performing a phase calculation step by changing over between wavelength filters for at least two different wavelengths, the phase calculation step comprising passing light from a light source through a wavelength filter, dividing the light passed through the wavelength filter and irradiating divided lights to an object to be inspected and a reference surface, superimposing lights respectively reflected by the object and the surface on each other for causing interference therebetween, picking up an image of interfering light resulted from the superimposition of the light reflected by the object to be inspected and the light reflected by the reference surface on each other, and calculating phases of interference fringes of the interfering light from the picked-up image;
thereafter, combining the phases of the interference fringes of the at least two wavelengths to detect the wavelength difference therebetween;
adjusting an inclination angle of one wavelength filter out of the plurality of wavelength filters with respect to the optical axis of the light incident to the wavelength filters, based on the wavelength difference; and measuring a surface shape of the object to be inspected by performing the phase calculation step, at a state where the inclination angle of the one wavelength filter is adjusted.

According to a sixth aspect of the present invention, there is provided the surface shape measurement method according to the fifth aspect, further comprising a calculation error prevention step for correcting the phases, based on the wavelength difference detected by combining the phases of the interference fringes of the two wavelengths.

According to a seventh aspect of the present invention, there is provided the surface shape measurement method according to the sixth aspect, comprising when combining the phases of the two wavelengths to detect the wavelength difference therebetween and, then, correcting the phases based on a detected actual wavelength difference in the calculation error prevention step, calculating the fringe orders at respective pixels by combining the phases of the two wavelengths by a fringe-order calculation unit, detecting, by a fringe-order distribution analysis unit, the wavelength difference and a phase difference between the two wavelengths from distribution of the fringe orders calculated by the fringe-order calculation unit, correcting a calculated value of one of the wavelengths for making a calculated wavelength difference coincident with an actual wavelength difference, by a wavelength-value correction unit, and calculating, by a phase-value correction unit, a phase value of one of the wavelengths with which the phase of the one wavelength is corrected to make the phase difference between the two wavelengths zero, and correcting the phase.

According to an eighth aspect of the present invention, there is provided the surface shape measurement method according to the seventh aspect, comprising when detecting the actual wavelength difference and the phase difference between the two wavelengths from the distribution of the fringe orders calculated by the fringe-order calculation unit in the fringe-order distribution analysis unit, calculating the fringe orders at pixels at which the fringe orders of the two wavelengths are coincident with each other, based on the phases of the interference fringes of the two wavelengths, and calculating a histogram of the fringe order distribution, detecting a plurality of peak positions in the histogram and a plurality of peak intervals in the histogram, and detecting the phase difference from the peak intervals and the peak positions.

According to a ninth aspect of the present invention, there is provided the surface shape measurement method according to the seventh aspect, comprising when adjusting, by the filter angle adjustment unit, the angle of the inclination of the one wavelength filter out of the plurality of wavelength filters such that the wavelength difference is coincident with a designed value, adjusting, by an angle control unit, the angle of the wavelength filters within a range of −1 to +1 degree with respect to a reference state where the wavelength filters are preliminarily inclined with respect to the optical axis by an angle set within a range of 5 to 10 degrees, and calculating an amount of angle control, by an amount-of-angle-control calculation unit, based on a difference between the designed value and the wavelength difference calculated by the fringe-order distribution analysis unit.

With the apparatus and the method having the aforementioned structure, it is possible to suppress the influence of wavelength fluctuations for measuring the surface shape of an object with higher accuracy than those of the related art. Further, it is possible to minimize the calculation errors in fringe orders, thereby improving the shape measurement accuracy. Further, it is possible to make the wavelength difference coincident with the designed wavelength difference any time, which prevents the wavelength difference from deviating from the conditions of the equations due to wavelength fluctuations, thereby preventing the degradation of the measurement accuracy with the time elapse or the temperature change.

EFFECTS OF THE INVENTION

With the present invention, it is possible to provide the advantage that it is possible to measure the surface shapes of objects with high accuracy through measurements according to the multi-wavelength phase-shift interferometry, with respect to objects having rough surface shapes and tending to induce fringe order errors or in environments which induce large temperature changes.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1B is a schematic view illustrating the structure of a changeover device in the interference measurement apparatus according to the first embodiment;

FIG. 1E is a block diagram illustrating the structure of an analysis unit in the interference measurement apparatus;

FIG. 2A is a flow chart for a first measurement according to a surface shape measurement method according to the first embodiment;

FIG. 2B is a flow chart for a second or later measurement according to the surface shape measurement method according to the first embodiment;

FIG. 7 is a schematic view illustrating an interference measurement apparatus as an example of a surface shape measurement apparatus according to a second embodiment of the present invention;

FIG. 8 is a flow chart of a measurement according to a surface shape measurement method according to the second embodiment;

DESCRIPTION OF EMBODIMENTS

Figure 1A:
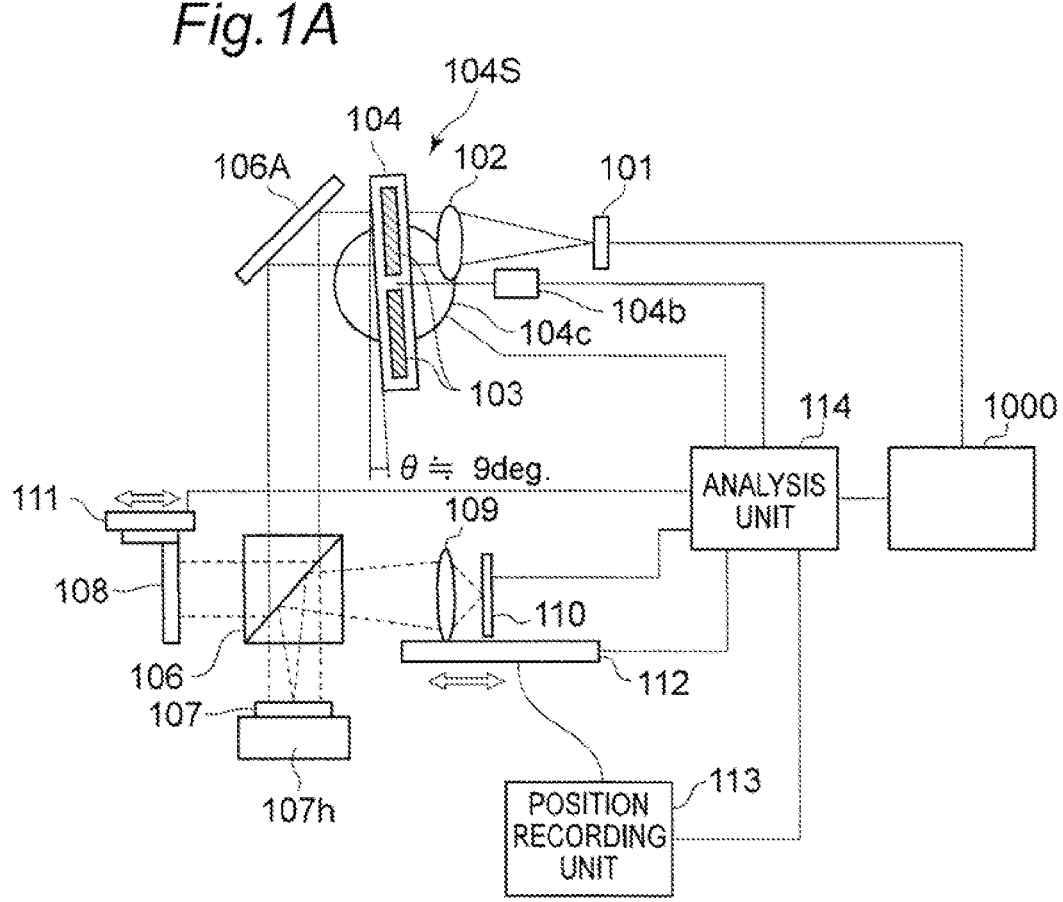
FIG. 1A is a schematic view illustrating an interference measurement apparatus as an example of a surface shape measurement apparatus according to a first embodiment of the present invention.

Before the description of the present invention proceeds, it is to be noted that like parts are designated by like reference numerals throughout the accompanying drawings.

Hereinafter, embodiments of the present invention will be described with reference to the drawings.

(First Embodiment)

FIG. 1A is a schematic view illustrating an interference measurement apparatus, as an example of a surface-shape measurement apparatus according to a first embodiment of the present invention.

In FIG. 1A, a light source 101 which is a low coherence light source as an example is a light source which emits light with a plurality of wavelengths (for example, both wavelengths $\lambda_1$ and $\lambda_2$). As the light source 101, it is possible to employ, for example, an SLD (Super Luminescent Diode), a halogen lamp, an LD (Luminescent Diode) having a high frequency wave superimposed thereon, and the like. Particularly, such an SLD is a light source capable of emitting light with high luminance in a wavelength range of several tens of nanometers and, also, suitable for a two-wavelength phase shift method.

The light emitted from the light source 101 is changed to parallel light by a collimate lens 102. The collimate lens 102 is desirably capable of making the emitted light with any of the two different wavelengths $\lambda_1$ and $\lambda_2$ parallel as much as possible and, also, making the distribution of the light quantity in the field of view of the measurement uniform as much as possible. For example, in order to uniformize the light quantity distribution of the light emitted from the SLD or the LD, it is possible to employ an anamorphic prism and the like, as an example of the collimate lens 102.

The light which has been changed to parallel light is limited in wavelength by a wavelength filter 103. The wavelength filter 103 has transmission wavelengths which fall within the wavelength range of the light emitted from the light source 101, and the two wavelengths ($\lambda_1$ and $\lambda_2$) passed through the wavelength filter 103 satisfy the relationship of (Equation 21), anytime. In this case, n is an integer.

$$n=\lambda_2/(\lambda_2-\lambda_1) \quad \text{[Equation 21]}$$

As the two wavelengths ($\lambda_1$ and $\lambda_2$), for example, a combination of wavelengths 780 nm and 810 nm satisfies the relationship of (Equation 21) and forms a synthesis wavelength $\lambda eq \approx 21$ micrometers, thereby widening the measurement range by about 26 times, in comparison with cases of only a single wavelength. This enables measurement of the surface shape of an object with a large variation in height, using the multi-wavelength phase-shift interferometry.

Further, the transmission-wavelength range of the wavelength filter 103 is desirably capable of ensuring a sufficient coherence length to perform measurements. For example, it is possible to employ an interference filter with a transmission-wavelength range of about several nanometers. When the transmission-wavelength range is 3 nm, the coherence length is about 100 micrometers. This value is a sufficient value even in consideration of the installation accuracy, in the present invention. A plurality of such wavelength filters 103 are mounted to a filter wheel 104 as an example of a changeover device (changeover mechanism) 104S, and the filter wheel 104 enables changeover among the wavelength filters 103 which pass different wavelengths therethrough. While the filter wheel 104 is employed in this case, it is also possible to change over among the plurality of wavelength filters, by pulling, through air cylinder(s), the plurality of wavelength filters into and out of the optical path along which the light from the light source 101 passes.

Figure 1C:
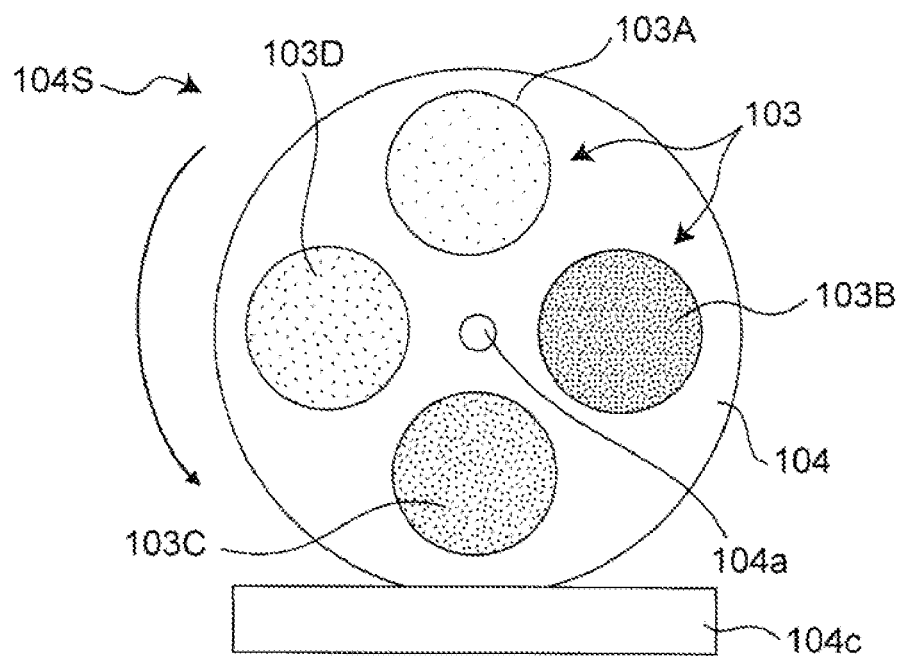
FIG. 1C is a schematic view illustrating the changeover device in the interference measurement apparatus according to the first embodiment, when it is viewed along an arrow C in FIG. 1B.
Figure 1D:
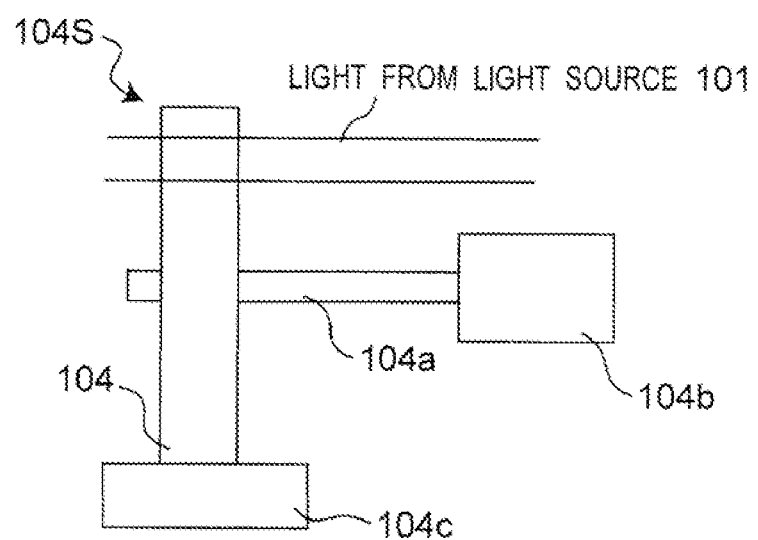
FIG. 1D is a schematic view illustrating the changeover device in the interference measurement apparatus according to the first embodiment, when it is viewed along an arrow D in FIG. 1B.

The changeover device 104S is constituted by a filter wheel 104, a rotation mechanism (an angle control unit) 104c, and a motor 104b, for example, as illustrated in FIGS. 1A to 1E. The filter wheel 104 carries a plurality of wavelength filters 103. As an example, as illustrated in FIG. 1C, the wavelength filters 103 are constituted by four wavelength filters 103A, 103B, 103C, and 103D which pass respective different wavelengths therethrough (for example, wavelength filters 103A and 103C for a wavelength $\lambda_1$, and wavelength filters 103B and 103D for a wavelength $\lambda_2$). A shaft 104a is secured to the filter wheel 104 at its rotational center, and a motor 104b is coupled at its rotational shaft to the shaft 104a. Further, if the motor 104b is driven to rotate, this causes the filter wheel 104 to rotate by a predetermined angle, thereby changing over the wavelength filter 103 for passing the light from the light source 101 therethrough to another wavelength filter 103. Using a rotational mechanism (inclination mechanism) 104c provided in the filter wheel 104, it is possible to adjust the inclination of the wavelength filters 103 with respect to the optical axis of the light from the light source 101. As the rotation mechanism (the angle control unit) 104c, it is possible to employ a known mechanism.

The rotation mechanism 104c functions as an example of a filter angle adjustment unit and adjusts the angle between the wavelength filter 103 and the optical axis of the light from the light source 101, in view of the wavelength fluctuation expected from the temperature change or the time elapse. Therefore, the rotation mechanism 104c is desirably capable of preliminarily setting the incidence angle of the light (the angle of the light incident to the wavelength filter 103 with respect to an axis orthogonal to the optical axis of the wavelength filter 103) to a predetermined angle (a reference angle) θ (for example, a value (an initial value) determined within the range of 5 to 10 degrees, such as 9 degrees) and, further, controlling the angle with accuracy of equal to or less than 0.01 degree, within the range of ±1 degree with respect to a reference angle θ. As a device or mechanism for realizing this, it is possible to employ a rotational stage which utilizes a step motor, for example.

The light passed through the wavelength filter 103 is reflected by a reflection mirror 106A toward a half mirror 106 and, thereafter, enters the half mirror 106. Further, the light passed thorough the wavelength filter 103 is divided by the half mirror 106, and lights resulted from the division are respectively incident to a reference surface 108 and an object 107 to be inspected held on a work holding portion 107h to be inspected such as an XY stage. The object 107 to be inspected is an object to be measured. Thereafter, the light reflected by the object 107 to be inspected and the light reflected by the reference surface 108 interfere with each other by being superimposed on each other by the half mirror 106, again. Further, the light superimposed on each other is passed through an image formation lens 109 to form an image on a camera 110. Namely, the light interfering with each other which has passed through the image formation lens 109 is caused to form an image on the light receiving device in the camera 110, which captures the image. The reference surface 108 is mounted to a piezo stage 111, so that the reference surface 108 can be moved in the direction of the optical axis by driving the piezo stage 111. The piezo stage 111 is capable of moving the reference surface 108 at least by a distance nearly equal to the wavelength of the light source.

Further, the half mirror 106, the reference surface 108, and the work holding portion 107h to be inspected constitute an example of an interference optical system 130. Further, the image formation lens 109 and the camera 110 constitute an example of an image pickup device (image pickup mechanism) 131.

An automatic stage 112 and a position recording unit 113 are adapted to move the image formation lens 109 and the camera 110 to positions at which they come into focus with respect to the light passed through the respective wavelength filters 103, in advance, and, further, record these positions. Further, under the control of a control unit 1000, the automatic stage 112 and the position recording unit 113 move the image formation lens 109 and the camera 110 to predetermined positions, in synchronization with the wavelength changeover by the filter wheel 109, along with the start of measurement. This means that, for example, according to the changeover of the wavelength filter 103 between the first wavelength $\lambda_1$ and the second wavelength $\lambda_2$, the automatic stage 112 and the position recording unit 113 move the image formation lens 109 and the camera 110 to positions for the first wavelength $\lambda_1$ and to positions for the second wavelength $\lambda_2$. This is because the combination of the aforementioned two wavelengths ($\lambda_1$, $\lambda_2$) of 780 nm and 810 nm induces a nonnegligible color aberration on the optical axis in the image formation lens 109 and, therefore, correction therefor is carried out. The image captured by the camera 110 which moves during the measurement is inputted from the camera 110 to an analysis unit 114, and the analysis unit 114 analyzes information about the inputted image. Namely, the analysis unit 114 performs the processing in the surface-shape measurement apparatus according to the present embodiment, except the angle control processing by the rotation mechanism 104c. The analysis unit 114 is constituted by a phase calculation unit 114c as an example of an interference-fringe phase detection unit, a calculation error prevention unit 114d, a surface-height calculation unit 114e, and an amount-of-angle-control calculation unit 114f, as illustrated in FIG. 1E. The analysis unit 114 is connected to the changeover device 104S, the angle control unit 104c, the camera 110, the position recording unit 113, the automatic stage 112, and the piezo stage 111 and, therefore, is capable of inputting and outputting necessary information thereto and therefrom and, also, performing surface-shape measurement operations in the surface-shape measurement apparatus, under the control of the control unit 1000. Further, the control unit 1000 is directly connected to the analysis unit 114 and the light source 101, further is indirectly connected through the analysis unit 114 to the changeover device 104S, the rotational mechanism 104c, the camera 110, the position recording unit 113, the automatic stage 112, and the piezo stage 111, and is adapted to control the respective operations thereof.

FIG. 2A is a view illustrating a measurement flow chart for shape measurement. With reference to FIG. 1A, FIG. 2A, and FIG. 2B, there will be described a shape measurement method using a two-wavelength interferometer having the same structure as that illustrated in the aforementioned FIG. 1A. The following processing is performed by the analysis unit 114 itself under the control of the control unit 1000.

At first, a phase shift is performed with the wavelength $\lambda_1$ (refer to step S101). The wavelength filter 103 is changed over to the wavelength filter 103 for the wavelength $\lambda_1$ (it is set to the wavelength $\lambda_1$) with the changeover device 104S, and the wavelength filter 103 is inclined by a predetermined angle (the reference angle) θ (for example, a value (an initial value) determined within the range of 5 to 10 degrees, such as 9 degrees) with the rotation mechanism 104c. Further, the image formation lens 109 and the camera 110 are moved, through the automatic state 112, to positions recorded in the position recording unit 113 at which the wavelength $\lambda_1$ come into focus with respect to them and, then, a phase-shifting operation is performed.

Next, a phase shift is performed with the wavelength $\lambda_2$ (refer to step S102). The wavelength filter 103 is changed over to the wavelength filter 103 for the wavelength $\lambda_2$ with the changeover device 104S, and the wavelength filter 103 is inclined by a predetermined angle (the reference angle) θ (for example, a value (an initial value) determined within the range of 5 to 10 degrees, such as 9 degrees) with the angle control unit 104c. Further, the image formation lens 109 and the camera 110 are moved, through the automatic state 112, to positions recorded in the position recording unit 113 at which the wavelength $\lambda_2$ come into focus with respect to them and, then, a phase-shifting operation is performed.

Next, images captured by the camera 110 are introduced to the phase calculation unit 114c in the analysis unit 114, and the introduced images are analyzed by the phase calculation unit 114c in the analysis unit 114 (refer to step S103). The introduced images are analyzed by the analysis unit 114 and, thus, data of the surface shape of the object (the surface heights of the object) and the amount of angle control for the wavelength $\lambda_2$ are calculated by the analysis unit 114. Thus, the first surface-shape measurement operation is completed.

FIG. 2B is a view illustrating a measurement flow chart for a second or later surface-shape measurement which is performed after the surface-shape measurement performed according to the measurement flow chart for the shape measurement in FIG. 2A. The following processing is also performed by the analysis unit 114 itself under the control of the control unit 1000.

At first, step S104 is an operation for preparing the next surface-shape measurement. Namely, based on the amount of angle control for the wavelength $\lambda_2$ which has been obtained by the processing in step S103, the incidence angle of the light with respect to the wavelength filter 103 is controlled by the rotation mechanism 104c (refer to step S104). In other words, the angle of the inclination of one wavelength filter 103 (the wavelength filter 103 for the wavelength $\lambda_2$), out of the plurality of wavelength filters 103, is adjusted by the rotation mechanism 104c, such that the actual wavelength difference is coincident with the designed value.

In the second measurement, at the state where the incidence angle of the light with respect to the wavelength filter 103 is controlled based on the result of the processing in step S104, the same steps S101 to S103 as those in FIG. 2A are performed for performing the second surface-shape measurement.

Steps S101 to S103, step S104, and steps S101 to S103 which have been described above are surface-shape measurement operations, and wavelength-control operations for making the measurement conditions invariable.

Figure 3:
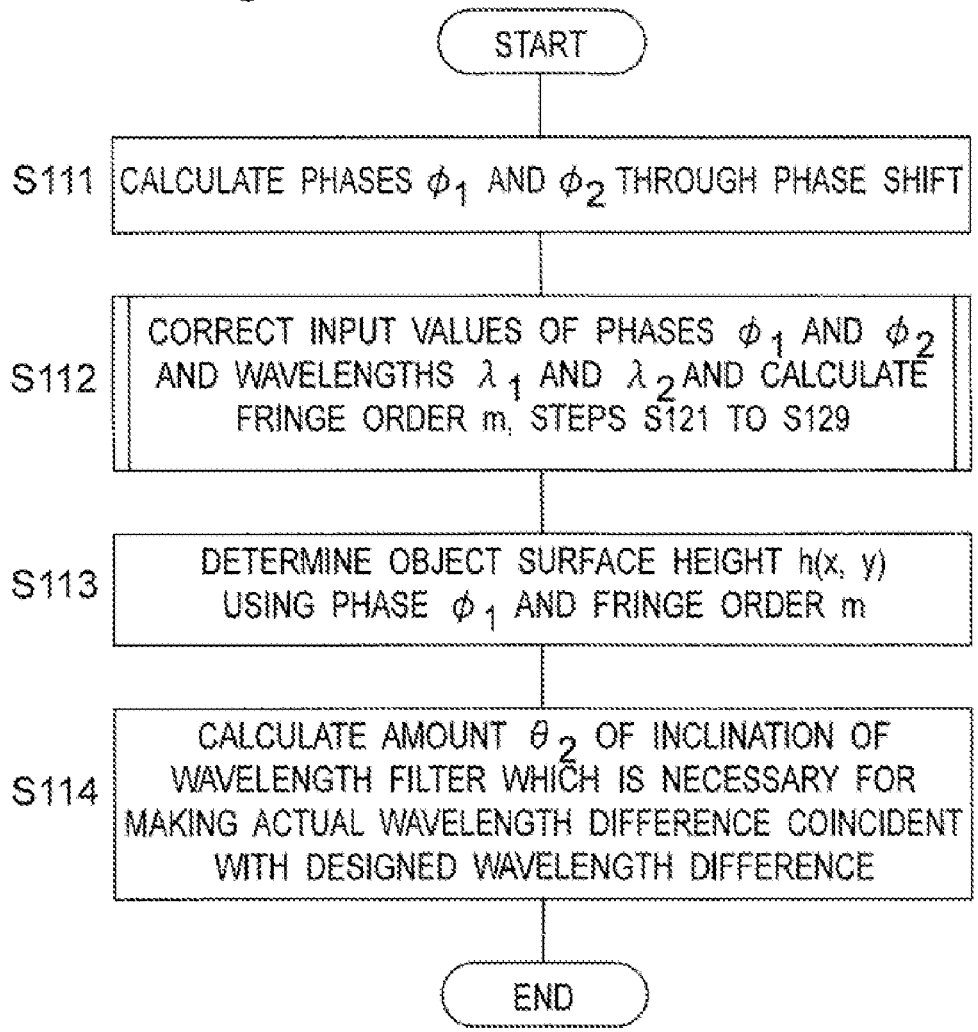
FIG. 3 is a flow chart of operations of the analysis unit according to the first embodiment.

Further, FIG. 3 is a flow chart illustrating the operations by the analysis unit 114 in the processing in step S103 illustrated in FIG. 2A and FIG. 2B. Hereinafter, the processing in step S103 will be described, in detail.

At first, the phase calculation unit 114c in the analysis unit 114 performs phase shifts with images of interfering light with the two wavelengths and to calculate the phases $\phi_1$ and $\phi_2$ of the interference fringes (refer to step S111).

Next, based on the inputted values of the wavelengths $\lambda_1$ and $\lambda_2$ and the phases $\phi_1$ and $\phi_2$ which have been calculated by the phase calculation unit 114c, a calculation error prevention unit 114d in the analysis unit 114 calculates the fringe order m, according to the aforementioned (Equation 6), (Equation 7), and (Equation 8) (refer to step S112). In other words, the calculation error prevention unit 114d combines the phases of the two wavelengths with each other for detecting the actual wavelength difference therebetween and, then, corrects the phases based on the detected actual wavelength. In this case, at first, before the calculation for the fringe order, the calculation error prevention unit 114d executes an "error prevention algorism" for correcting the wavelength values and the phase values, such that the deviation $\Delta m$ from the ideal fringe order $m_1$ is minimized. This "error prevention algorism" will be described later. Using the corrected wavelength values and the corrected phase values, the calculation error prevention unit 119d calculates the fringe order m, according to (Equation 6), (Equation 7), and (Equation 8).

Next, using the phase $\phi_1$ and the fringe order m, the surface-height calculation unit 114e in the analysis unit 114 obtains the object surface height h(x, y) according to the aforementioned (Equation 2) (step S113).

Next, the amount-of-angle-control calculation unit 114f in the analysis unit 114 calculates the incidence angle of the light with respect to the wavelength filter 103 which is necessary for making the wavelength difference in the actually-directed light coincident with the designed value (step S114).

At first, the actual wavelength difference is preliminarily detected according to the "error prevention algorism" which will be described later, using the calculation error prevention unit 114d in the processing in step S112, and the difference $\Delta$ from the designed wavelength difference is calculated by the amount-of-angle-control calculation unit 114f.

Next, the amount-of-angle-control calculation unit 114f calculates the amount of angle control for the wavelength filter 103 and, in this case, the reference angle $\theta$ of the wavelength filter 103 is preliminarily set to 90 degrees, and the angle thereof is adjusted within a very small range of $-1$ degrees to +1 degree with respect to the reference angle $\theta$. As the range of the selection of the reference angle $\theta$, for example, the reference angle is selected from the range of 5 to 10 degrees. This is because if the reference angle is out of this range, the amount of light transmission is excessively reduced, which is not preferable. Thus, the angle and the difference $\Delta$ from the designed wavelength difference can be linearly approximated, and the amount $\theta_2$ of inclination can be obtained according to (Equation 22).

$$\theta_2 = a(\Delta/\lambda_0) + 9 \text{ [deg]} \qquad \text{(Equation 22)}$$

In this case, $\lambda_0$ is the wavelength (nm) of the wavelength filter 103, and $\Delta$ is the amount (nm) of desired correction of the wavelength. "a" is a factor determined by the characteristics of the wavelength filter 103 and the reference angle. For example, "a" has a value of 781.3, in the case of the interference filter according to the present embodiment. For a wavelength near 800 nm, it is possible to perform wavelength control by about ±1 nm within the range of $-1$ degree to +1 degree. The temperature characteristic of the wavelength filter 103 can be expressed as 0.03 nm/degree C. for the wavelength and, therefore, it can be seen therefrom that the wavelength fluctuation can be sufficiently addressed.

Further, in the processing in step S114, the amount-of-angle-control calculation unit 114f controls one wavelength out of the two wavelengths for making the wavelength difference coincident with the designed value. The effect of controlling one wavelength out of the two wavelengths for continuously fixing the wavelength difference can be verified from (Equation 23) and (Equation 24). In the case of controlling the wavelength difference $\lambda_2 - \lambda_1$ to be constant, respectively, and in the case of not controlling it to be constant, the amount $\Delta n$ of the change of the number n of fringe orders with respect to the change of $\lambda_1$ is as follows.

(1) In the case of controlling the wavelength difference to be constant, (Equation 23) holds.

(2) In the case of not controlling the wavelength difference to be constant, (Equation 24) holds.

Accordingly, the amount $\Delta n$ of change is reduced by $(\lambda_2 - \lambda_1)/\lambda_1$ times.

$$\Delta n = dn/d\lambda_1 = 1/(\lambda_2 - \lambda_1) \qquad \text{(Equation 23)}$$

$$\Delta n = dn/d\lambda_1 = \lambda_1/(\lambda_2 - \lambda_1)^2 \qquad \text{(Equation 24)}$$

For example, it is assumed that the wavelength $\lambda_1$ is 780 nm and the wavelength $\lambda_2$ is 810 nm, and only the transmission wavelength of the wavelength filter 103 for the wavelength $\lambda_1$ is changed due to the temperature change. Assuming that the wavelength-to-temperature characteristic is about 0.03 nm/degree C., and the temperature change is 30 degree C., the change of the wavelength $\lambda_1$ is 0.9 nm. Further, when the number n of fringe orders before the occurrence of the temperature change is 26, in the case of performing the control of the wavelength difference, the amount $\Delta n$ of change equals to 0.03 nm and, thus, the number of fringe orders is hardly changed, while in cases of not performing the wavelength control, the amount $\Delta n$ of change equals to 0.835. Accordingly, the change of the number n of fringe orders in the aforementioned (Equation 21) can be largely suppressed, which causes the number n of fringe orders to always have a value close to an integer. Accordingly, even in cases of surface shapes exceeding the measurement range provided by the two wavelengths, the "error prevention algorism" is effective. Since labeling and other methods are not employed, widening the range of objects to be measured is of significance.

Figure 4:
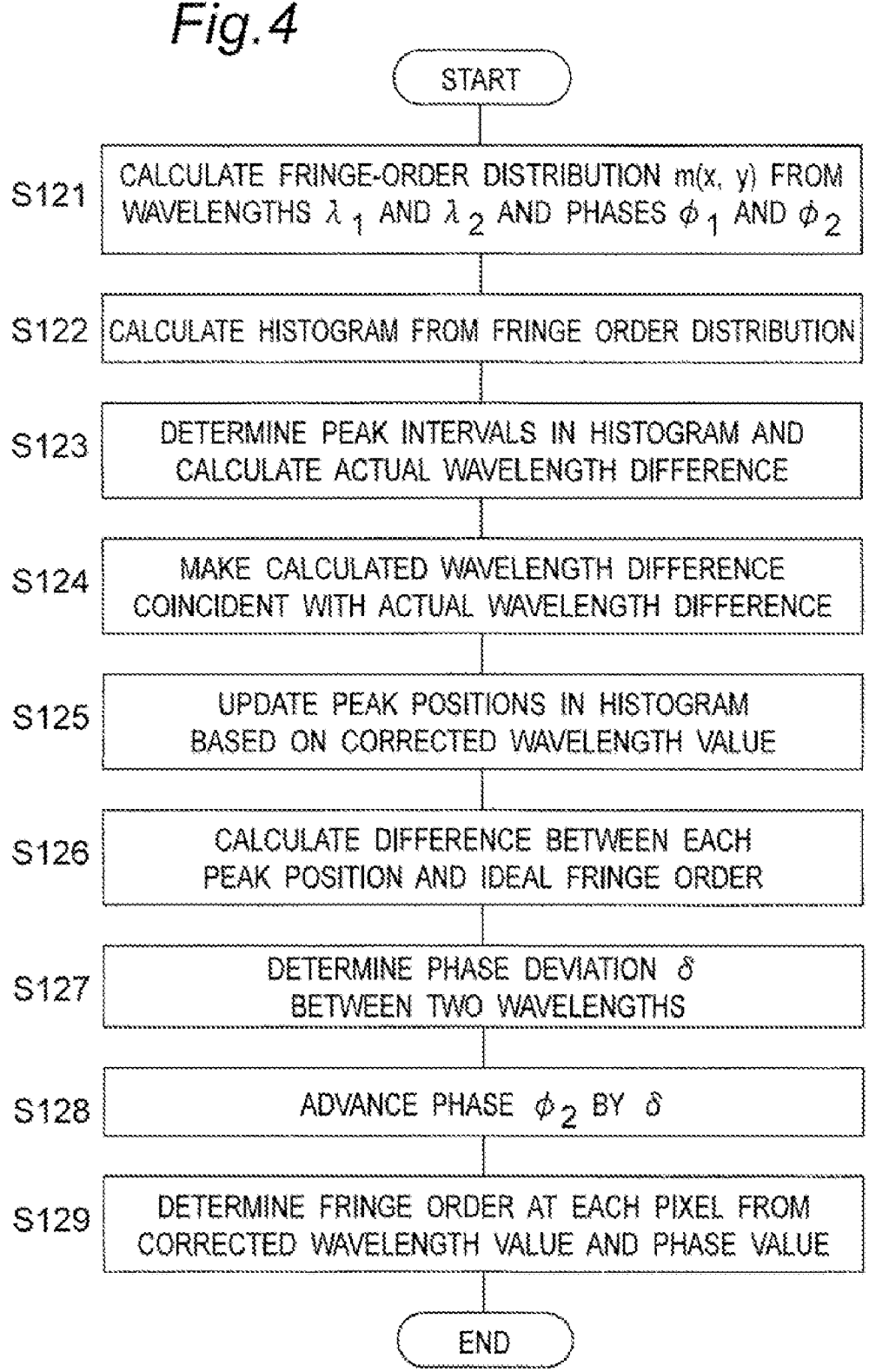
FIG. 4 is a flow chart of a measurement according to an error prevention algorism according to the first embodiment.

FIG. 4 is a flow chart illustrating the operations for the portion of the "error prevention algorism" which are performed through the calculation error prevention unit 114d. In order to perform the following processing, the calculation error prevention unit 114d is constituted by a fringe-order calculation unit 114d-1, a fringe-order distribution analysis unit 114d-2, a wavelength-value correction unit 114d-3, and a phase-value correction unit 114d-4, as illustrated in FIG. 1E.

At first, the fringe-order calculation unit 114d-1 in the calculation error prevention unit 114d calculates the fringe order m at each pixel, similarly to according to the aforementioned (Equation 6), (Equation 7), and (Equation 8) (step S121) from the values and the phases of the two wavelengths $\lambda_1$ and $\lambda_2$. At this time, rounding is not performed.

Figure 5:
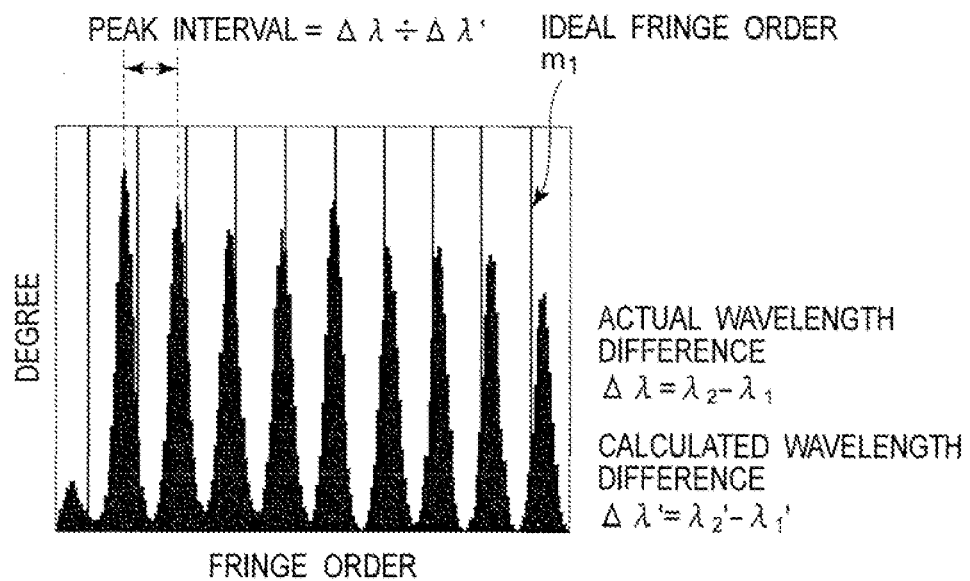
FIG. 5 is a histogram before correcting a fringe-order distribution according to the first embodiment.

Next, the fringe-order distribution analysis unit 114d-2 in the calculation error prevention unit 114d creates a fringe-order distribution m(x, y) from the determined fringe orders within the field of view, further extracts appropriate pixels from the created fringe-order distribution m(x, y), and calculates a histogram of fringe orders m (step S122). In this case, the extraction of appropriate pixels means extracting pixels at portions having interference fringes with higher contrasts than a threshold value (pixels which can be treated as effective pixels). For the extraction of pixels, it is desirable to satisfy the condition of $m_1=m_2$ in (Equation 6). FIG. 5 illustrates a histogram obtained from actual measurements. As can be seen from (Equation 18), the histogram has peaks at intervals of $\Delta\lambda/\Delta\lambda'$ and indicates a distribution having a shift indicated by the second term of (Equation 18).

Next, the fringe-order distribution analysis unit 114d-2 in the calculation error prevention unit 114d determines the plurality of peak positions in the histogram and the plurality of peak intervals in the histogram and, further, calculates the actual wavelength difference (step S123). As a method for calculating peak intervals, it is possible to employ various methods, but it is desirable to employ a method having high resistance against noise, such as a method which determines a power spectrum through a Fourier transform. By multiplying the peak interval by the calculated wavelength difference $\Delta\lambda'$, it is possible to calculate the actual wavelength difference $\Delta\lambda$.

Next, the wavelength-value correction unit 114d-3 in the calculation error prevention unit 114d makes the calculated wavelength difference $\Delta\lambda'$ coincident with the actual wavelength difference $\Delta\lambda$ (step S124). The wavelength $\lambda_1$ or the wavelength $\lambda_2$ is corrected for making the calculated wavelength difference $\Delta\lambda'$ coincident with the actual wavelength difference $\Delta\lambda$, in order to make the first term in (Equation 19) "zero".

Next, the phase value correction unit 114d-4 in the calculation error prevention unit 114d updates the peak positions in the histogram, based on the corrected wavelength values (a step 125). This necessitates only updating the peak positions according to (Equation 18), without recalculating the histogram.

Next, the phase value correction unit 114d-4 in the calculation error prevention unit 114d calculates the difference between each peak position and the ideal fringe order (step S126). This is for the sake of determining the second term in (Equation 19) with higher accuracy. In this case, for the calculation for the difference, it is possible to employ, for example, a method which determines all the differences between the respective peak positions and the ideal fringe orders and determines the average over them.

Next, the fringe-order distribution analysis unit 114d-2 in the calculation error prevention unit 114d determines the phase difference between the two wavelengths, namely the phase deviation δ between the two wavelengths, from the peak positions (step S127). Assuming that the second term in the (Equation 19) is X, it is possible to determine the phase deviation δ from (Equation 25).

$$\delta = -\{2\pi(\lambda_2'-\lambda_1')/\lambda_2'\} \times X \quad \text{(Equation 25)}$$

Next, the phase value correction unit 114d-4 in the calculation error prevention unit 114d performs processing for forwardly advancing the phase $\phi_2$ by the phase deviation δ (step S128). In order to forwardly advance the phase $\phi_2$ at each pixel by the phase deviation δ, it is possible to employ various methods, but it is possible to attain this by simply adding the phase deviation δ to $\phi_2$ at each pixel and, further, subtracting or adding $2\pi$ from or to the part exceeding $2\pi$ or the part below 0.

Figure 6:
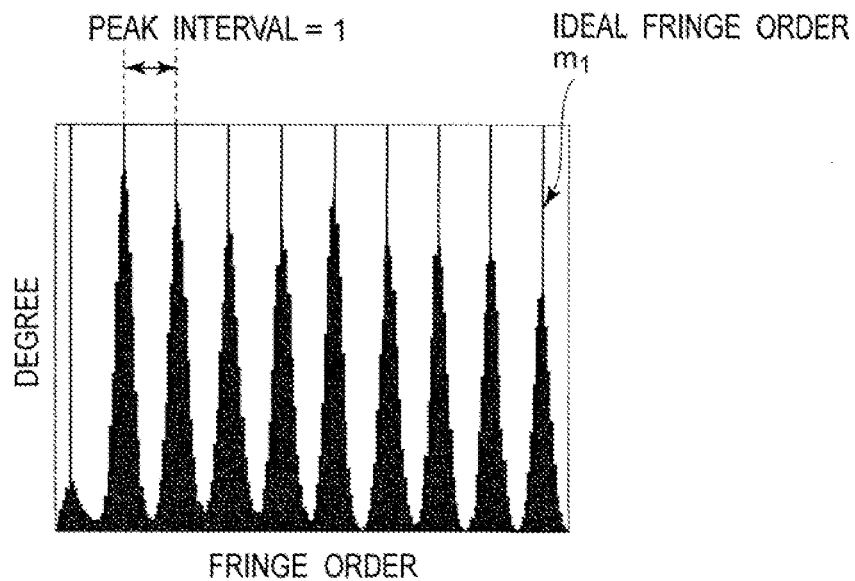
FIG. 6 is a histogram after correcting the fringe-order distribution according to the first embodiment.
Figure 9A:
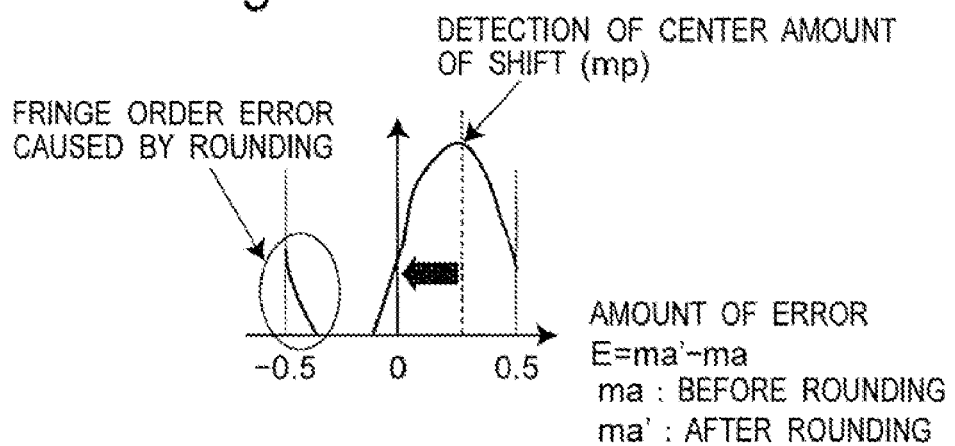
FIG. 9A is a view of the principle of a conventional fringe-order correction algorism.
Figure 9B:
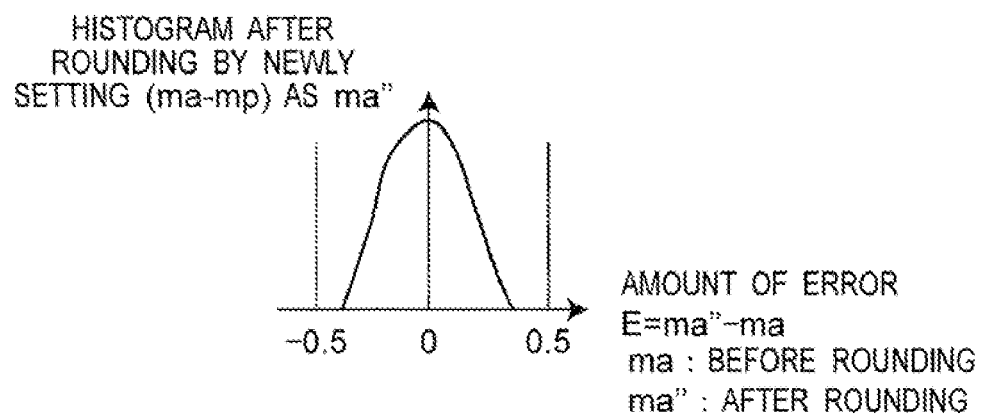
FIG. 9B is a view of the principle of the conventional fringe-order correction algorism.

Next, the calculation error prevention unit 114d calculates the fringe-order distribution m(x, y) from the corrected values of the wavelength $\lambda_2''$ and the phase $\phi_2'$ and to perform rounding thereon for determining the fringe order m at each pixel (step S129). The histogram obtained at this time has peaks which are coincident with the ideal fringe orders $m_1$, as illustrated in FIG. 6.

With the aforementioned structure, it is possible to minimize the fringe order error without being influenced by the wavelength fluctuation expected from the temperature change or the time elapse in two-wavelength phase shifts, which can improve the measurement accuracy in comparison with conventional algorisms. Hereinafter, there will be described cases where the measurement accuracy is improved.

In cases of measurement for circuit patterns, objects to be measured have level differences of orders of 10 to 50 micrometers and, assuming that the measurement range is 100 micrometers, the necessary measurement accuracy is 100 nm.

Regarding the measurement accuracy of the method in Patent Document 1, in the case of $\lambda_1$=800 nm and $\lambda_2$=805 nm, assuming that the temperature change is ±20 degrees C., a wavelength fluctuation of 0.03 (nm/degree C.)×20 (degrees C.)=0.6 (nm) is induced. Further, in cases of measurement for level differences of 50 micrometers, the measurement accuracy is 1.78 micrometers and, therefore, the accuracy is insufficient.

Figure 10:
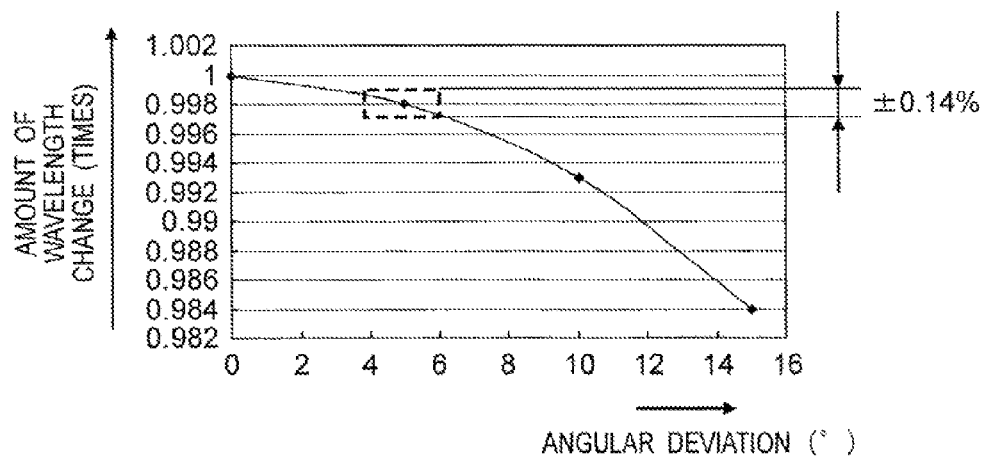
FIG. 10 is a graph illustrating the amount of wavelength change with respect to the angular deviation of a wavelength filter with respect to an optical axis in cases of measurement for a circuit pattern.

On the contrary, with the measurement according to the first embodiment, it is possible to perform measurements with measurement accuracy of 37.3 nm. In this case, regarding the amount of necessary angle control for the wavelength filter 103, in the case of controlling the wavelength of the light from the light source within the range of $\lambda_2$ of ±0.6 nm (±0.07%), in order to address a temperature change of 20 degrees C., it is necessary only to control it within the range of 4 to 6 degrees, with respect to θ=5 degrees. FIG. 10 is a graph illustrating the amount of wavelength change with respect to the angular deviation of the wavelength filter 103 with respect to the optical axis of the light from the light source 101.

In cases of measurement for display-panel electrode patterns, objects to be measured have level differences of orders of 1 to 10 micrometers and, assuming that the measurement range is 20 micrometers, the necessary measurement accuracy is 10 nm.

Regarding the measurement accuracy of the method of Patent Document 1, in the case of $\lambda_1$=780 nm and $\lambda_2$=810 nm, assuming that the temperature change is 20 degrees, a wavelength fluctuation of 0.03 (nm/degree C.)×20 (degrees C.)=0.6 (nm) is induced. Further, in cases of measurement for level differences of 10 micrometers, the measurement accuracy is 189 nanometers and, therefore, the accuracy is insufficient.

Figure 11:
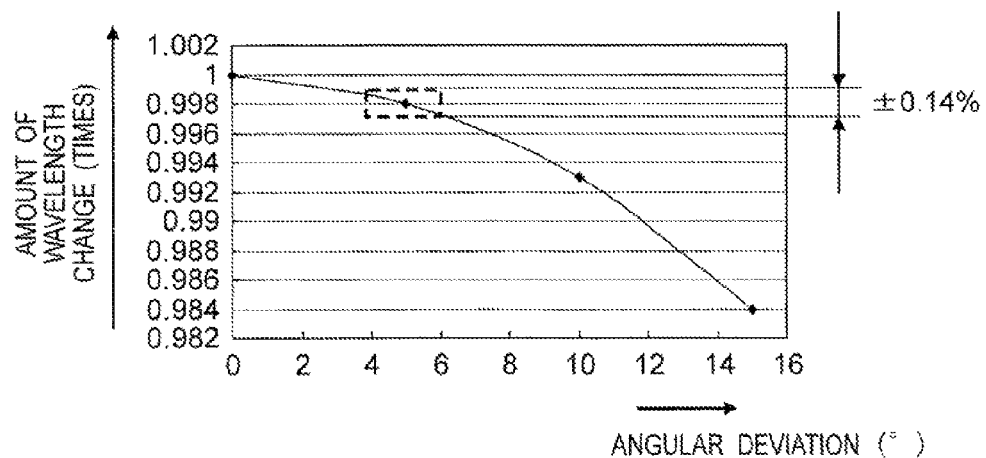
FIG. 11 is a graph illustrating the amount of wavelength change with respect to the angular deviation of a wavelength filter with respect to an optical axis in cases of measurement for a display-panel electrode pattern.

On the contrary, with the measurement according to the first embodiment, it is possible to perform measurement with measurement accuracy of 7.41 nm. In this case, regarding the amount of necessary angle control for the wavelength filter, in the case of controlling the wavelength within the range of $\lambda_2$ of ±0.6 nm (±0.07%), in order to address a temperature change of 20 degrees C., it is necessary only to control it within the range of 4 to 6 degrees, with respect to θ=5 degrees. FIG. 11 is a graph illustrating the amount of wavelength change with respect to the angular deviation of the wavelength filter 103 with respect to the optical axis of the light from the light source 101. Further, for the same amount of temperature change, the amount of the wavelength change is not varied, regardless of the measurement range.

(Second Embodiment)

FIG. 7 is a schematic view illustrating an interference measurement apparatus as an example of a surface shape measurement apparatus according to a second embodiment of the present invention.

In FIG. 7, the same components as those in FIG. 1A to FIG. 1E are designated by the same reference characters, with their explanations omitted. In the second embodiment, a filter wheel 204 corresponds to the filter wheel 104 according to the aforementioned first embodiment. In the second embodiment, three wavelength filters 103 (103A, 103B and 103E) are mounted on the filter wheel 204. It is possible to perform changeover among the three wavelength filters 103 (103A, 103B and 103E), through a changeover device 104S (for structuring it, for example, the wavelength filter 103E can be placed instead of the wavelength filter 103C in FIG. 1C). Assuming that the respective wavelength filters 103 (103A, 103B and 103E) have different transmission wavelengths $\lambda_1$, $\lambda_2$, and $\lambda 3$, the combination of two wavelengths in the two-wavelength phase shift operations satisfies (Equation 21), any time. For example, hereinafter, it is assumed that a combination of two-wavelength phase shifts with ($\lambda_1, \lambda_2$) and ($\lambda_1, \lambda_3$) is employed for performing a three-wavelength phase shift, and the combination of these wavelengths satisfies (Equation 21), any time.

FIG. 8 is a view illustrating a measurement flowchart for shape measurement. With reference to FIG. 7 and FIG. 8, there will be described a shape measurement method with a three-wavelength phase shift interferometer as an interference measurement apparatus having the structure illustrated in FIG. 7. Further, the three-wavelength phase shift according to the second embodiment is operations corresponding to the combination of the two-wavelength phase shift and the error prevention algorism according to the aforementioned first embodiment. The following processing is performed under the control of an analysis unit 114 or performed by the analysis unit 114 itself.

At first, two-wavelength phase shifts are performed with the wavelengths $\lambda_1$ and $\lambda_2$ (refer to step S201). This operation corresponds to the processing in the aforementioned steps S101 to S103 in FIG. 2A and FIG. 2B. However, as the analysis in the processing in step S103, the processing in steps S111 to S112 in FIG. 3 is performed for obtaining a fringe order $m_a$ and correction values for the phase $\phi_2$ and the wavelength $\lambda_2$.

Next, two-wavelength phase shifts are performed with the wavelengths $\lambda_1$ and $\lambda_3$ (refer to step S202). Similarly to in the processing in step S201, a fringe order $m_b$ and correction values for the phase $\phi_3$ and the wavelength $\lambda_3$ are obtained.

Next, synthesis phases $\phi_a$ and $\phi_b$ are formed using the fringe orders $m_a$ and $m_b$ (refer to step S203). The synthesis phase $\phi_a$ can be determined according to (Equation 26). The synthesis phase $\phi_b$ can be also determined similarly to the synthesis phase $\phi_a$.

$$\phi_a = \{(\lambda_2 - \lambda_1)/\lambda_2\}(\phi_1 + 2\pi m_a) \quad \text{(Equation 26)}$$

Next, two-wavelength phase shifts are performed for the synthesis phases $\phi_a$ and $\phi_b$ (refer to step S204). This operation corresponds to the processing in steps S101 to S103 in FIG. 2A and FIG. 2B and the processing in steps S111 to S112 in FIG. 3. It is not necessary to correct the synthesis phases $\phi_a$ and $\phi_b$, provided that the wavelengths and the phases have been corrected through the processing in step S201 and the processing in step S202. The determined fringe order is rounded to obtain a fringe order $m_c$.

Next, from the fringe order $m_c$ and the fringe order $m_a$, according to (Equation 27), the fringe order m within the measurement range provided by the three-wavelength synthesis wavelength is calculated (refer to step S205).

$$m = m_a + \{\lambda_2/(\lambda_2 - \lambda_1)\}m_c \quad \text{(Equation 27)}$$

Next, the obtained fringe order m is rounded, and the rounded fringe order is substituted into (Equation 2) for calculating the height h(x, y) (refer to step S206).

Next, based on the wavelength differences detected in the processing in step S201 and the processing in step S202, the wavelength differences are made coincident with the designed values, similarly to in the processing in step S114 in FIG. 3 (refer to step S207). Thus, the actual wavelengths $\lambda_2$ and $\lambda_3$ are corrected, and the numbers of fringe orders indicated by (Equation 21) become integers. This can maintain excellent error detection accuracy similarly, in the processing in step S201 and the processing in step S202 for the next measurement.

With this structure, it is possible to measure the surface shapes of objects with higher accuracy in comparison with measurements according to conventional multi-wavelength phase-shift interferometries, by correcting the wavelength error and the phase deviation, regardless of the object surface shapes and the wavelength fluctuations expected from the temperature change or the time elapse.

Further, by properly combining the arbitrary embodiments or modification examples of the aforementioned various embodiments or modification examples, the effects possessed by the embodiments or modification examples can be produced.

INDUSTRIAL APPLICABILITY

With the surface shape measurement apparatus and method according to the present invention, it is possible to correct calculated values for addressing the wavelength error and the phase deviation and then fix the wavelength difference, which can improve the measurement accuracy for measurements in environments which induce large temperature changes or for objects having rough surface characters which tend to induce fringe order errors. Further, the surface shape measurement apparatus and the method according to the present invention can be possibly applied to calibration of wavelengths of a light source with measurements of masters. Accordingly, the present invention is applicable to, for example, surface shape measurements for display panel electrodes, circuit patterns, or metal processed parts, in order to evaluate object surface shapes.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A surface shape measurement, apparatus comprising:
a light source for emitting light;
a plurality of wavelength filters having respective different transmission wavelengths;
a changeover device for changing over among the plurality of wavelength filters;
an interference optical system configured to divide light passed through one wavelength filter out of the plurality of wavelength filters among which changeover is performed by the changeover device, further irradiate with divided lights an object to be inspected and a reference surface, and superimpose lights respectively reflected by the object and the surface on each other for causing interference therebetween;
an image pickup device configured to pick up an image of interference fringes resulted from the interference caused by the interference optical system;
an interference-fringe phase detection unit for calculating a phase of interference fringes from the image created through the image pickup by the image pickup device;

a filter angle adjustment unit which is configured to combine phases of interference fringes of at least two wavelengths, which have been calculated through changeover among the plurality of wavelength filters by the changeover device, to detect a wavelength difference therebetween, and, further, is configured to adjust an inclination angle of one wavelength filter out of the plurality of wavelength filters with respect to optical axis of the light incident to the wavelength filters, based on the wavelength difference; and an analysis unit configured to measure a surface shape of the object to be inspected, using the interference optical system, the image pickup device, and the interference fringe phase detection unit, at a state where the inclination angle of the one wavelength filter is adjusted.

2. The surface shape measurement apparatus according to claim 1, further comprising a calculation error prevention unit for correcting the phases of the interference fringes, based on the wavelength difference detected by combining the phases of the interference fringes of at least two wavelengths.

3. The surface shape measurement apparatus according to claim 2, wherein the calculation error prevention unit comprises a fringe-order calculation unit for calculating the fringe orders at respective pixels by combining the two wavelengths and the phases, a fringe-order distribution analysis unit for detecting wavelength difference and phase difference between the two wavelengths from distribution of the fringe orders calculated by the fringe-order calculation unit, a wavelength-value correction unit for correcting a calculated value of one of the wavelengths for making a calculated wavelength difference coincident with the wavelength difference, and a phase-value correction unit for calculating a phase value of one of the wavelengths with which the phase of the one wavelength is corrected to make the phase difference between the two wavelengths zero, and correcting the phase.

4. The surface shape measurement apparatus according to claim 3, wherein the filter angle adjustment unit comprises an angle control unit for adjusting the angle of the wavelength filters within a range of −1 to +1 degree with respect to a reference state where the wavelength filters are preliminarily inclined with respect to the optical axis by an angle set within a range of 5 to 10 degrees and, further, comprises an amount-of-angle-control calculation unit for calculating an amount of angle control, based on a difference between the designed value and the wavelength difference calculated by the fringe-order distribution analysis unit, and in the calculation error prevention unit, the two wavelengths ($\lambda_1$, $\lambda_2$) combined through the plurality wavelength filters satisfy (Equation 1) at the reference state of the angle control unit, assuming that n is an integer:

$$n = \lambda_2/(\lambda_2 - \lambda_1) \quad \text{(Equation 1)}.$$

5. A surface shape measurement method comprising;

performing a phase calculation step by changing over between wavelength filters for at least two different wavelengths, the phase calculation step comprising passing light from a light source through a wavelength filter, dividing the light passed through the wavelength filter and irradiating divided lights to an object to be inspected and a reference surface, superimposing lights respectively reflected by the object and the surface on each other for causing interference therebetween, picking up an image of interfering light resulted from the superimposition of the light reflected by the object to be inspected and the light reflected by the reference surface on each other, and calculating phases of interference fringes of the interfering light from the picked-up image;

thereafter, combining the phases of the interference fringes of the at least two wavelengths to detect the wavelength difference therebetween;

adjusting an inclination angle of one wavelength filter out of the plurality of wavelength filters with respect to the optical axis of the light incident to the wavelength filters, based on the wavelength difference; and measuring a surface shape of the object to be inspected by performing the phase calculation step, at a state where the inclination angle of the one wavelength filter is adjusted.

6. The surface shape measurement method according to claim 5, further comprising a calculation error prevention step for correcting the phases, based on the wavelength difference detected by combining the phases of the interference fringes of the two wavelengths.

7. The surface shape measurement method according to claim 6, comprising when combining the phases of the two wavelengths to detect the wavelength difference therebetween and, then, correcting the phases based on a detected actual wavelength difference in the calculation error prevention step, calculating the fringe orders at respective pixels by combining the phases of the two wavelengths by a fringe-order calculation unit, detecting, by a fringe-order distribution analysis unit, the wavelength difference and a phase difference between the two wavelengths from distribution of the fringe orders calculated by the fringe-order calculation unit, correcting a calculated value of one of the wavelengths for making a calculated wavelength difference coincident with an actual wavelength difference, by a wavelength-value correction unit, and calculating, by a phase-value correction unit, a phase value of one of the wavelengths with which the phase of the one wavelength is corrected to make the phase difference between the two wavelengths zero, and correcting the phase.

8. The surface shape measurement method according to claim 7, comprising when detecting the actual wavelength difference and the phase difference between the two wavelengths from the distribution of the fringe orders calculated by the fringe-order calculation unit in the fringe-order distribution analysis unit, calculating the fringe orders at pixels at which the fringe orders of the two wavelengths are coincident with each other, based on the phases of the interference fringes of the two wavelengths, and calculating a histogram of the fringe order distribution, detecting a plurality of peak positions in the histogram and a plurality of peak intervals in the histogram, and detecting the phase difference from the peak intervals and the peak positions.

9. The surface shape measurement method according to claim 7, comprising when adjusting, by the filter angle adjustment unit, the angle of the inclination of the one wavelength filter out of the plurality of wavelength filters such that the wavelength difference is coincident with a designed value, adjusting, by an angle control unit, the angle of the wavelength filters within a range of −1 to +1 degree with respect to a reference state where the wavelength filters are preliminarily inclined with respect to the optical axis by an angle set within a range of 5 to 10 degrees, and calculating an amount of angle control, by an amount-of-angle-control calculation unit, based on a difference between the designed value and the wavelength difference calculated by the fringe-order distribution analysis unit.

* * * * *